(12) United States Patent
Komatsu et al.

(10) Patent No.: US 7,800,260 B2
(45) Date of Patent: Sep. 21, 2010

(54) VEHICLE DRIVING APPARATUS

(75) Inventors: Yutaka Komatsu, Nagoya (JP);
Yasuhiro Endo, Okazaki (JP);
Kazutaka Tatematsu, Nagoya (JP);
Takeshi Yamazaki, Shibuya-ku (JP);
Hiromichi Kuno, Nishikamo-gun (JP);
Tadafumi Yoshida, Nisshin (JP)

(73) Assignee: Toyota Jidosha Kabushiki Kaisha,
Aichi-ken (JP)

( * ) Notice: Subject to any disclaimer, the term of this patent is extended or adjusted under 35 U.S.C. 154(b) by 307 days.

(21) Appl. No.: 12/092,215

(22) PCT Filed: Oct. 27, 2006

(86) PCT No.: PCT/JP2006/322053

§ 371 (c)(1),
(2), (4) Date: Apr. 30, 2008

(87) PCT Pub. No.: WO2007/052779

PCT Pub. Date: May 10, 2007

(65) Prior Publication Data

US 2009/0250271 A1    Oct. 8, 2009

(30) Foreign Application Priority Data

Nov. 1, 2005 (JP) .............................. 2005-318140

(51) Int. Cl.
*B60K 1/00* (2006.01)
(52) U.S. Cl. ........................................ 310/54; 180/65.1
(58) Field of Classification Search .................. 310/54; 180/65.6, 243, 65.22, 65.1, 65.2; 417/327; 361/688

See application file for complete search history.

(56) References Cited

U.S. PATENT DOCUMENTS

| 2004/0154846 A1* | 8/2004 | Kira ......................... 180/65.6 |
| 2004/0226761 A1 | 11/2004 | Takenaka et al. |
| 2005/0211490 A1 | 9/2005 | Shimizu et al. |

FOREIGN PATENT DOCUMENTS

| CN | 2121741 U | 11/1992 |
| CN | 1663837 A | 9/2005 |
| JP | 10-042407 A | 2/1998 |
| JP | 2001-119961 A | 4/2001 |
| JP | 2004-201409 A | 7/2004 |
| JP | 2004-284447 A | 10/2004 |
| JP | 2004-343845 A | 12/2004 |
| JP | 2005-032830 A | 2/2005 |

(Continued)

*Primary Examiner*—Quyen Leung
*Assistant Examiner*—Naishadh N Desai
(74) *Attorney, Agent, or Firm*—Sughrue Mion, PLLC

(57) ABSTRACT

A driving gear of a vehicle comprising a motor generator (MG2), a power control unit (21) for controlling the motor generator (MG2), and a case for containing the motor generator (MG2) and the power control unit (21). The power control unit (21) comprises a first inverter for driving the motor generator (MG2), and a voltage converter for applying power supply voltage to the first inverter after stepping it up. The voltage converter includes a reactor (L1). Heat of the reactor (L1) is dissipated using lubricant touching the reactor (L1) and the case as heat transfer agent. A circulation path of lubricant is formed in the case and the reactor is arranged on the circulation path.

10 Claims, 16 Drawing Sheets

FOREIGN PATENT DOCUMENTS

| | | |
|---|---|---|
| JP | 2005-073392 A | 3/2005 |
| JP | 2005-117790 A | 4/2005 |
| JP | 2005-150517 A | 6/2005 |
| JP | 2005-253167 A | 9/2005 |
| JP | 2007099121 A * | 4/2007 |

* cited by examiner

VEHICLE DRIVING APPARATUS

CROSS REFERENCE TO RELATED APPLICATIONS

This application is a National Stage of International Application No. PCT/JP2006/322053 filed on Oct. 27, 2006, claiming priority based on Japanese Patent Application No. 2005-318140, filed Nov. 1, 2005, the contents of all of which are incorporated herein by reference in their entirety.

TECHNICAL FIELD

The present invention relates to a vehicle driving apparatus and, more specifically, to a vehicle driving apparatus in which an inverter and a motor are housed in one case.

BACKGROUND ART

Most of the currently available hybrid vehicles have a structure in which a large, box-shaped case of the inverter is fixed on the chassis, and a motor case (trans axle) is arranged therebelow. Considering a driving apparatus for a hybrid vehicle that can be mounted on as wide a variety of models as possible, a structure having two cases is disadvantageous in component standardization, as the arrangements must be optimized model by model.

In principle, it is desirable to put units that require combined operation into one case for integration. In view of the foregoing, Japanese Patent Laying-Open Nos. 2004-343845 and 2001-119961 disclose drive units for a hybrid vehicle in which motors and inverters are integrated.

The driving units for a hybrid vehicle disclosed in Japanese Patent Laying-Open Nos. 2004-343845 and 2001-119961, however, have a structure in which the inverter is simply put on the motor, and there is room for improvement as to the position of center of gravity of the vehicle in the vertical direction, when the structure is installed in the vehicle. Further, reduction in space for mounting the driving unit of the hybrid vehicle is not sufficiently considered.

In order to enable installation to wide variety of models, it is desired that the inverter and the motor are arranged in comparable contour as an automatic transmission generally arranged next to an engine in an ordinary vehicle.

Recently, vehicles having a converter for boosting a battery voltage to attain higher efficiency have been developed. Prior art documents mentioned above are silent about the concept of integrating the inverter and the motor in consideration of integration of the boost converter. When the boost converter is to be integrated, sufficient consideration must be given to the heat generated at the boost converter portion. Particularly for a reactor, which is a large component, some measures for cooling must be provided.

DISCLOSURE OF THE INVENTION

An object of the present invention is to provide a vehicle driving apparatus having a boost converter and an inverter integrated and reduced in size.

In short, the present invention provides a vehicle driving apparatus, including: a first rotating electrical machine; a power control unit controlling the first rotating electrical machine; and a case accommodating the first rotating electrical machine and the power control unit. The power control unit includes a first inverter driving the first rotating electrical machine, and a voltage converter boosting a power supply voltage and applying the boosted voltage to the first inverter. The voltage converter includes a reactor. The vehicle driving apparatus further includes heat transmitting agent in contact with the reactor and the case.

Preferably, the heat transmitting agent is lubricant oil that lubricates and cools the first rotating electrical machine. The vehicle control apparatus further includes a portion for circulating the lubricant oil. A circulation path for the lubricant oil is formed in the case. The reactor is arranged on the circulation path.

More preferably, the circulating portion includes a gear that is immersed in the lubricant oil and rotates as the first rotating electrical machine rotates, and an oil catching plate for receiving the lubricant oil scooped up by the gear.

More preferably, the case includes an oil pan arranged downstream of the circulation path, and the circulating portion includes a gear that scoops up the lubricant oil from the oil pan as the rotating electrical machine rotates, and feeds the lubricant oil to a portion upstream than the reactor in the lubricant path.

Preferably, the case includes a first housing chamber accommodating the reactor; and the reactor is immersed in the heat transmitting agent in the first housing chamber.

More preferably, the heat transmitting agent is lubricant oil that lubricates and cools the first rotating electrical machine. The vehicle control apparatus further includes a portion for circulating the lubricant oil. A circulation path for the lubricant oil is formed in the case. The case further includes a second housing chamber accommodating the first rotating electrical machine and a partition wall separating the first and second housing chambers. A hole forming a part of the circulation path is formed in the partition wall.

More preferably, the reactor includes a coil, an iron core, and an insulator molding the coil and the iron core. The insulator is formed to have a flange shape to serve as a lid of the first housing chamber.

More preferably, the heat transmitting agent is lubricant oil that lubricates and cools the first rotating electrical machine, and the first housing chamber is an oil pan reserving the lubricant oil.

Preferably, the vehicle includes an internal combustion engine. The vehicle driving apparatus further includes a second rotating electrical machine, and a power split device having a first shaft receiving rotation of a rotor of the first rotating electrical machine, a second shaft receiving rotation of a rotor of the second rotating electrical machine and a third shaft receiving rotation of the crankshaft. The case further accommodates the second rotating electrical machine and the power split device.

More preferably, the power control unit further includes a second inverter provided corresponding to the second rotating electrical machine; and the voltage converter is provided commonly to the first and second inverters.

By the present invention, it is possible to realize a vehicle driving apparatus integrated with the boost converter and the inverter and reduced in size.

BRIEF DESCRIPTION OF THE DRAWINGS

In FIG. 7, a control circuit board 121 for controlling a power element is positioned at an upper portion of a power element circuit board.

BEST MODES FOR CARRYING OUT THE INVENTION

Figure 1:
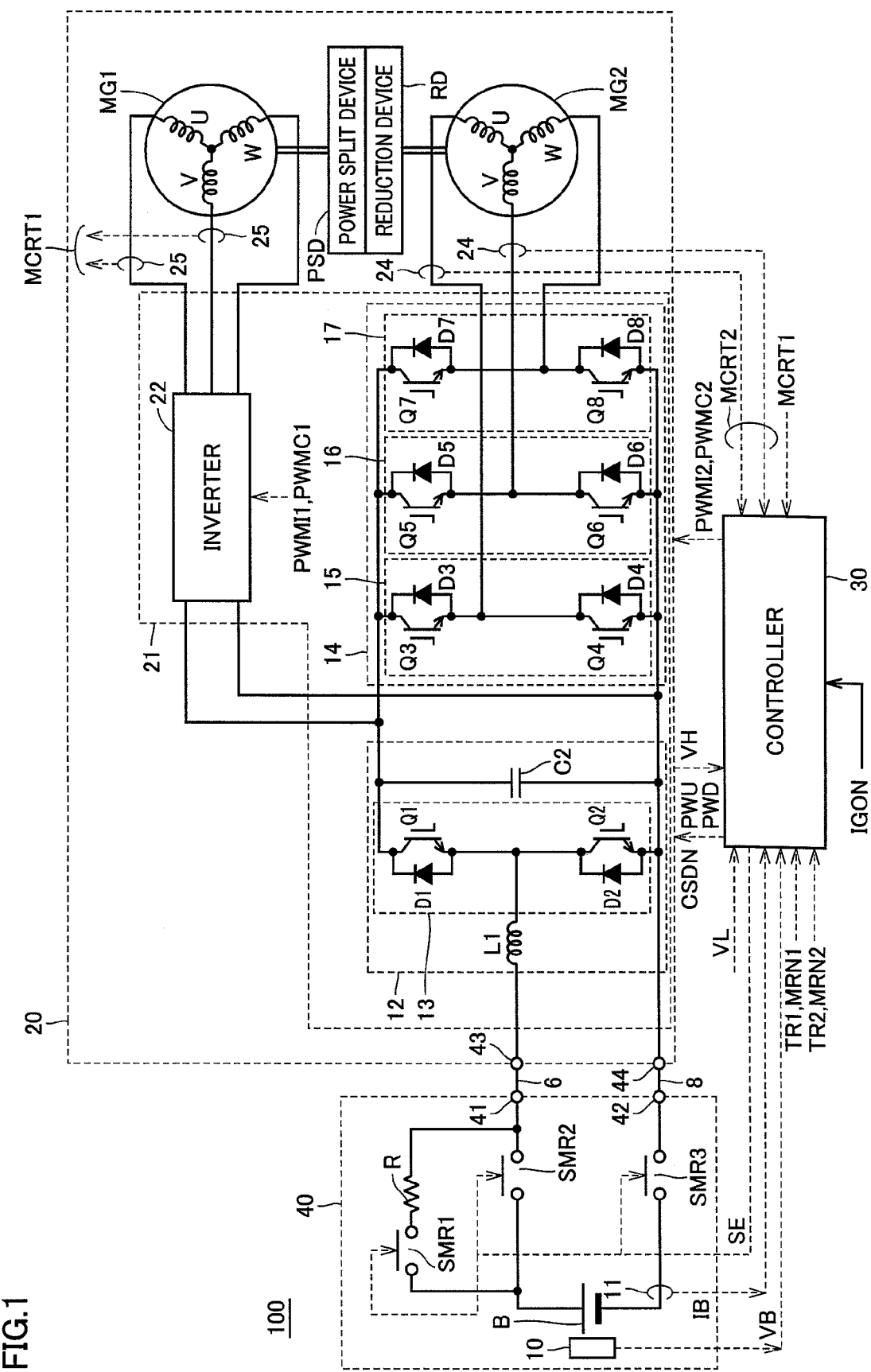
FIG. 1 is a circuit diagram representing a configuration related to motor generator control of a hybrid vehicle 100 in accordance with an embodiment of the present invention.

In the following, embodiments of the present invention will be described in detail with reference to the figures. In the figures, the same or corresponding portions are denoted by the same reference characters, and description thereof will not be repeated.

[Description of Vehicle Components]

FIG. 1 is a circuit diagram showing a configuration related to motor generator control of a hybrid vehicle 100 in accordance with an embodiment of the present invention.

Referring to FIG. 1, a vehicle 100 includes a battery unit 40, a driving apparatus 20, a controller 30 and an engine and wheels, not shown.

Driving apparatus 20 includes motor generators MG1 and MG2, power split device PSD, reduction device RD, and power control unit 21 controlling motor generators MG1 and MG2.

Power split device PSD is a mechanism coupled to engine 4 and motor generators MG1 and MG2, splitting power among these. By way of example, as power split device PSD, a planetary gear mechanism having three rotation shafts of sun gear, planetary gear and ring gear, may be used.

Two rotation axes of power split device PSD are connected to rotation shafts of engine 4 and motor generator MG1, respectively, and the other rotation shaft is connected to reduction device RD. By the reduction device RD integrated with power split device PSD, the rotation of motor generator MG2 is reduced and transmitted to power split device PSD.

The rotation shaft of reduction device RD is coupled to the wheels by a reduction gear or a differential gear, not shown. The reduction gear is not essential, and a structure may be adopted in which the rotation of motor generator MG2 is transmitted to power split device PSD without reduction.

Battery unit 40 is provided with terminals 41 and 42. Further, driving apparatus 20 is provided with terminals 43 and 44. Vehicle 100 further includes a power cable 6 connecting terminals 41 and 43, and a power cable 8 connecting terminals 42 and 44.

Battery unit 40 includes battery B, a system main relay SMR3 connected. between the negative pole of battery B and terminal 42, a system main relay SMR2 connected between the positive pole of battery B and terminal 41, and a system main relay SMR 1 and a limiting resistor R connected in series between the positive pole of battery B and terminal 41. State of conduction/non-conduction of system main relays SMR1 to SMR3 is controlled in accordance with a control signal SE applied from controller 30.

Battery unit 40 further includes a voltage sensor 10 measuring a voltage VB between terminals of battery B, and a current sensor 11 detecting a current IB flowing to battery B.

As battery B, a nickel hydride or lithium ion secondary battery or a fuel cell may be used. Further, as an electric storage in place of battery B, a capacitor of large capacity such as an electric double layer capacitor may be used.

Power control unit 21 includes inverters 22 and 14 provided corresponding to motor generators MG1 and MG2, respectively, and a boost converter 12 provided common to inverters 22 and 14.

Boost converter 12 boosts the voltage between terminals 43 and 44. Inverter 14 converts the DC voltage applied from boost converter 12 to a three-phase AC and outputs it to motor generator MG2.

Boost converter 12 includes a reactor L1 having one end connected to terminal 43, IGBT elements Q1 and Q2 connected in series between output terminals of boost converter 12 outputting the boosted voltage VH, diodes D1 and D2 connected in parallel with IGBT elements Q1 and Q2 respectively, and a smoothing capacitor C2. Smoothing capacitor C2 smoothes the voltage boosted by boost converter 12.

The other end of reactor L1 is connected to the emitter of IGBT element Q1 and to the collector of IGBT element Q2. Diode D1 has its cathode connected to the collector of IGBT element Q1, and its anode connected to the emitter of IGBT element Q1. Diode D2 has its cathode connected to the collector of IGBT element Q2 and its anode connected to the emitter of IGBT element Q2.

Inverter 14 converts the DC voltage output from boost converter 12 to three-phase AC and outputs it to motor generator MG2 driving the wheels. Further, in regenerative braking, inverter 14 returns power generated by motor generator MG2 to boost converter 12. At this time, boost converter 12 is controlled by controller 30 such that it operates as a voltage lowering circuit.

Inverter 14 includes a U-phase arm 15, a V-phase arm 16, and a W-phase arm 17. U-phase, V-phase and W-phase arms 15, 16 and 17 are connected in parallel between output lines of boost converter 12.

U-phase arm 15 includes series-connected IGBT elements Q3 and Q4 and diodes D3 and D4 connected in parallel with IGBT elements Q3 and Q4, respectively. Diode D3 has its cathode connected to the collector of IGBT element Q3, and its anode connected to the emitter of IGBT element Q3. Diode D4 has its cathode connected to the collector of IGBT element Q4, and its anode connected to the emitter of IGBT element Q4.

V-phase arm 16 includes series-connected IGBT elements Q5 and Q6 and diodes D5 and D6 connected in parallel with IGBT elements Q5 and Q6, respectively. Diode D5 has its cathode connected to the collector of IGBT element Q5, and its anode connected to the emitter of IGBT element Q5. Diode D6 has its cathode connected to the collector of IGBT element Q6 and its anode connected to the emitter of IGBT element Q6.

W-phase arm 17 includes series-connected IGBT elements Q7 and Q8 and diodes D7 and D8 connected in parallel with IGBT elements Q7 and Q8, respectively. Diode D7 has its cathode connected to the collector of IGBT element Q7 and its anode connected to the emitter of IGBT element Q7. Diode D8 has its cathode connected to the collector of IGBT element Q8 and its anode connected to the emitter of IGBT element Q8.

The mid point of the arm of each phase is connected to the end of each phase of each coil of motor generator MG2. Specifically, motor generator MG2 is a three-phase, permanent magnet synchronous motor, and three coils of U, V and W phases each have one end connected together to a neutral point. The other end of U-phase coil is connected to a connection node of IGBT elements Q3 and Q4. The other end of V-phase coil is connected to the connection node of IGBT elements Q5 and Q6. The other end of W-phase coil is connected to the connection node of IGBT elements Q7 and Q8.

Current sensor 24 detects a current flowing through motor generator MG2 as a motor current value MCRT2, and outputs the motor current value MCRT2 to controller 30.

Inverter 22 is connected to boost converter 12 in parallel with inverter 14. Inverter 22 converts the DC voltage output from boost converter 12 to three-phase AC and outputs the same to motor generator MG1. Receiving the boosted voltage from boost converter 12, inverter 22 drives motor generator MG1, for example, to start the engine.

Further, inverter 22 supplies the power generated by motor generator MG1 by the rotary torque transmitted from a crankshaft of the engine to boost converter 12. At this time, boost converter 12 is controlled by controller 30 such that it operates as a voltage lowering circuit.

Though not shown, internal configuration of inverter 22 is the same as that of inverter 14 and, therefore, detailed description thereof will not be repeated.

Controller 30 receives torque command values TR1 and TR2, motor rotation numbers MRN1 and MRN2, values of voltages VB, VL and VH and of current IB, the motor current values MCRT1 and MCRT2, and an activation signal IGON.

Here, torque command value TR1, motor rotation number MRN1 and motor current value MCRT1 are related to motor generator MG1, and torque command value TR2, motor rotation number MRN2 and motor current value MCRT2 are related to motor generator MG2.

Further, voltage VB is the voltage of battery B, and current IB is the current flowing through battery B. Voltage VL is the voltage before boosting by boost converter 12, and voltage VH is the voltage after boosting by boost converter 12.

Controller 30 outputs a control signal PWU instructing boost converter 12 to boost the voltage, a control signal PWD to lower the voltage, and a signal CSDN instructing an operation inhibition.

Further, controller 30 outputs, to inverter 14, a driving instruction PWMI2 for converting the DC voltage as an output of boost converter 12 to an AC voltage for driving motor generator MG2, and a regeneration instruction PWMC2 for converting an AC voltage generated by motor generator MG2 to a DC voltage and returning the same to the side of boost converter 12.

Similarly, controller 30 outputs, to inverter 22, a driving instruction PWMI1 for converting the DC voltage to an AC voltage for driving motor generator MG1, and a regeneration instruction PWMC1 for converting an AC voltage generated by motor generator MG1 to a DC voltage and returning the same to the side of boost converter 12.

Figure 2:
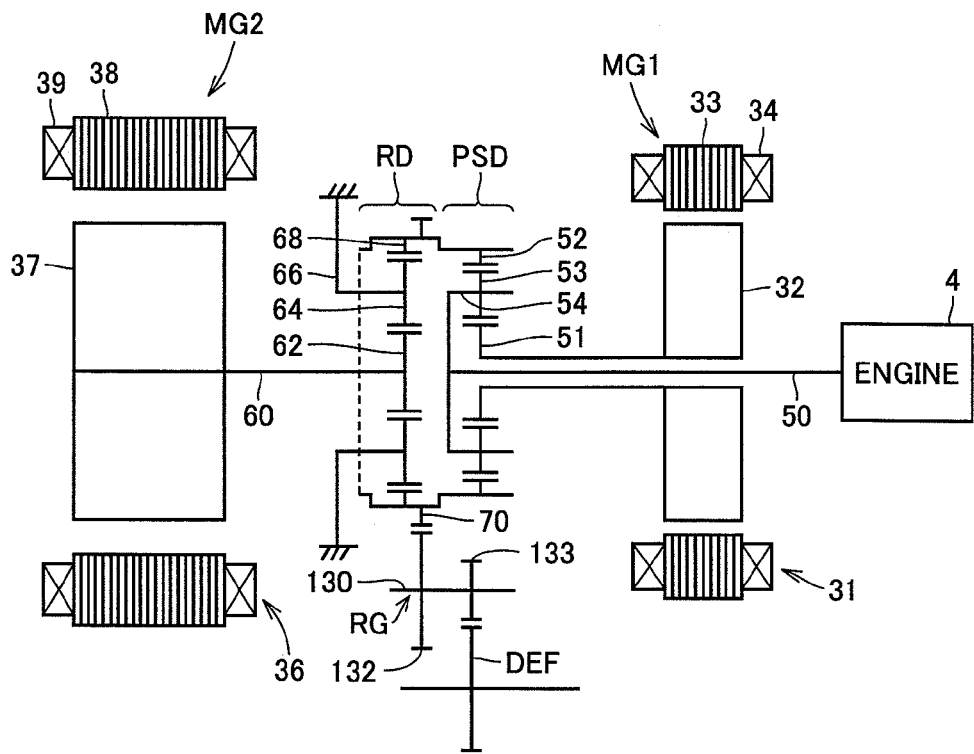
FIG. 2 is an illustration representing details of the power split device PSD and the reduction device RD shown in FIG. 1.

FIG. 2 is an illustration representing details of the power split device PSD and the reduction device RD shown in FIG. 1.

Referring to FIG. 2, the hybrid power output device in accordance with the present invention includes a motor generator MG2, a reduction device RD connected to the rotation shaft of motor generator MG2, an axle that rotates along with the rotation of the rotation shaft reduced by reduction device RD, engine 4, motor generator MG1, and power split device PSD for distributing power among reduction device RD, engine 4 and motor generator MG1. Reduction ratio of reduction device RD from motor generator MG2 to power split device PSD is, for example, at least twice.

A crankshaft 50 of engine 4, a rotor 32 of motor generator MG1 and a rotor 37 of motor generator MG2 rotate about the same axis.

Power split device PSD is, in the example shown in FIG. 2, a planetary gear, including: a sun gear 51 coupled to a hollow sun gear shaft, with a crank shaft 50 passing through the center of the shaft; a ring gear 52 rotatably supported on the same axis as crank shaft 50; a pinion gear 53, arranged between sun gear 51 and ring gear 53, rotating and revolving around an outer circumference of sun gear 51; and a planetary carrier 54 coupled to an end portion of crank shaft 50 and supporting axis of rotation of each pinion gear 53.

In power split device PSD, three shafts, that is, a sun gear shaft coupled to sun gear 51, a ring gear case coupled to ring gear 52, and a crank shaft 50 coupled to planetary carrier 54 serve as power input/output shafts. When power input to/output from two of the three shafts is determined, the power to be input to/output from the remaining one shaft is determined based on the power input to/output from the other two shafts.

A counter drive gear 70 for taking out power is provided on the outside of ring gear case, and rotates integrally with ring gear 52. Counter drive gear 70 is connected to power transmission reduction gear RG. Power is transmitted between counter drive gear 70 and power transmission reduction gear RG. Power transmission reduction gear RG drives a differential gear DEF. Further, driving down hill, rotation of wheels is transmitted to differential gear DEF, and power transmission reduction gear RG is driven by differential gear DEF.

Motor generator MG1 includes a stator 31 forming a rotating magnetic field, and a rotor 32 arranged in stator 31 and having a plurality of permanent magnets embedded therein. Stator 31 includes a stator core 33 and a three-phase coil 34 wound around stator core 33. Rotor 32 is coupled to the sun gear shaft that rotates integrally with sun gear 51 of power split device PSD. Stator core 33 is formed by stacking thin electromagnetic steel sheets and fixed in a case, not shown.

Motor generator MG1 operates as an electric motor for rotating and driving rotor 32 by an interaction between a magnetic field formed by the permanent magnets embedded in rotor 32 and a magnetic field formed by three-phase coil 34. Further, motor generator MG1 operates as a power generator generating an electromotive force at opposite ends of three-phase coil 34 by the interaction between the magnetic field of permanent magnets and the rotation of rotor 32.

Motor generator MG2 includes a stator 36 forming a rotating magnetic field, and a rotor 37 arranged in stator 31 and having a plurality of permanent magnets embedded therein. Stator 36 includes a stator core 38 and a three-phase coil 39 wound around stator core 38.

Rotor 37 is coupled to a ring gear case rotating integrally with ring gear 52 of power split device PSD through reduction device RD. Stator core 38 is formed by stacking thin electromagnetic steel sheets and fixed in a case, not shown.

Motor generator MG2 also operates as a power generator generating an electromotive force at opposite ends of three-phase coil 39 by the interaction between the magnetic field of permanent magnets and the rotation of rotor 37. Further, motor generator MG2 also operates as an electric motor for rotating and driving rotor 37 by an interaction between a magnetic field formed by the permanent magnets and a magnetic field formed by three-phase coil 39.

Reduction device RD performs speed reduction by the structure in which planetary carrier 66 as one of rotating elements of the planetary gear is fixed on a case of the vehicle driving apparatus. Specifically, reduction device RD includes sun gear 62 coupled to the shaft of rotor 37, a ring gear 68 rotating integrally with ring gear 52, and a pinion gear 64 engaged with ring gear 68 and sun gear 62, for transmitting rotation of sun gear 62 to ring gear 68.

By way of example, by setting the number of teeth of ring gear 68 twice as large as the number of teeth of sun gear 62, the reduction ratio can be set twice or higher.

EMBODIMENT 1

Figure 3:
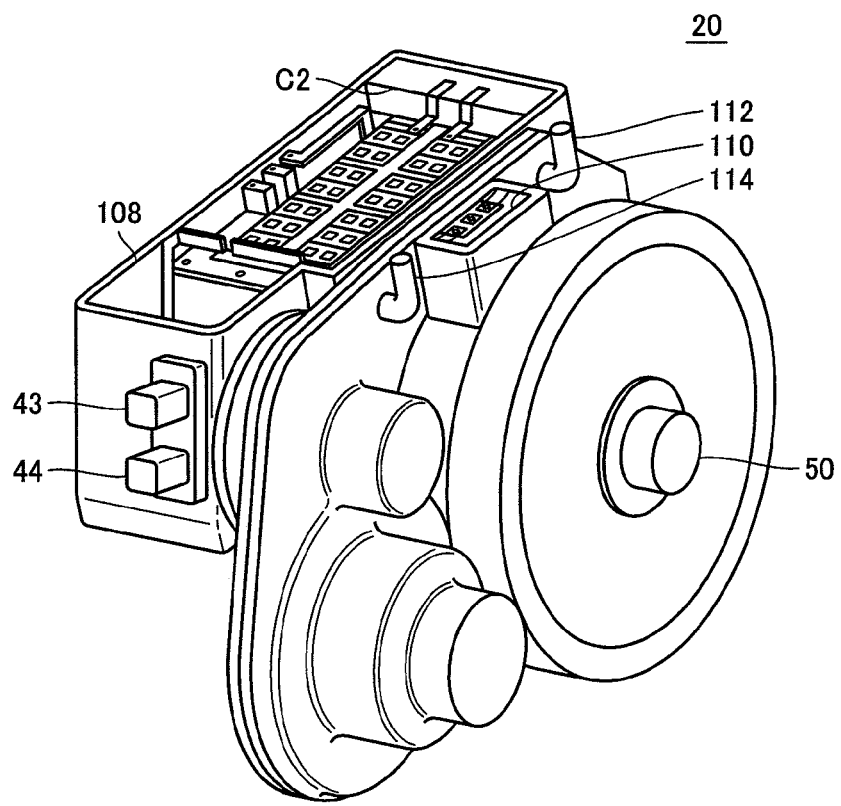
FIG. 3 is a perspective view showing an appearance of a driving apparatus 20 of the hybrid vehicle in accordance with an embodiment of the present invention.

FIG. 3 is a perspective view showing an appearance of a driving apparatus 20 of the hybrid vehicle in accordance with an embodiment of the present invention.

Figure 4:
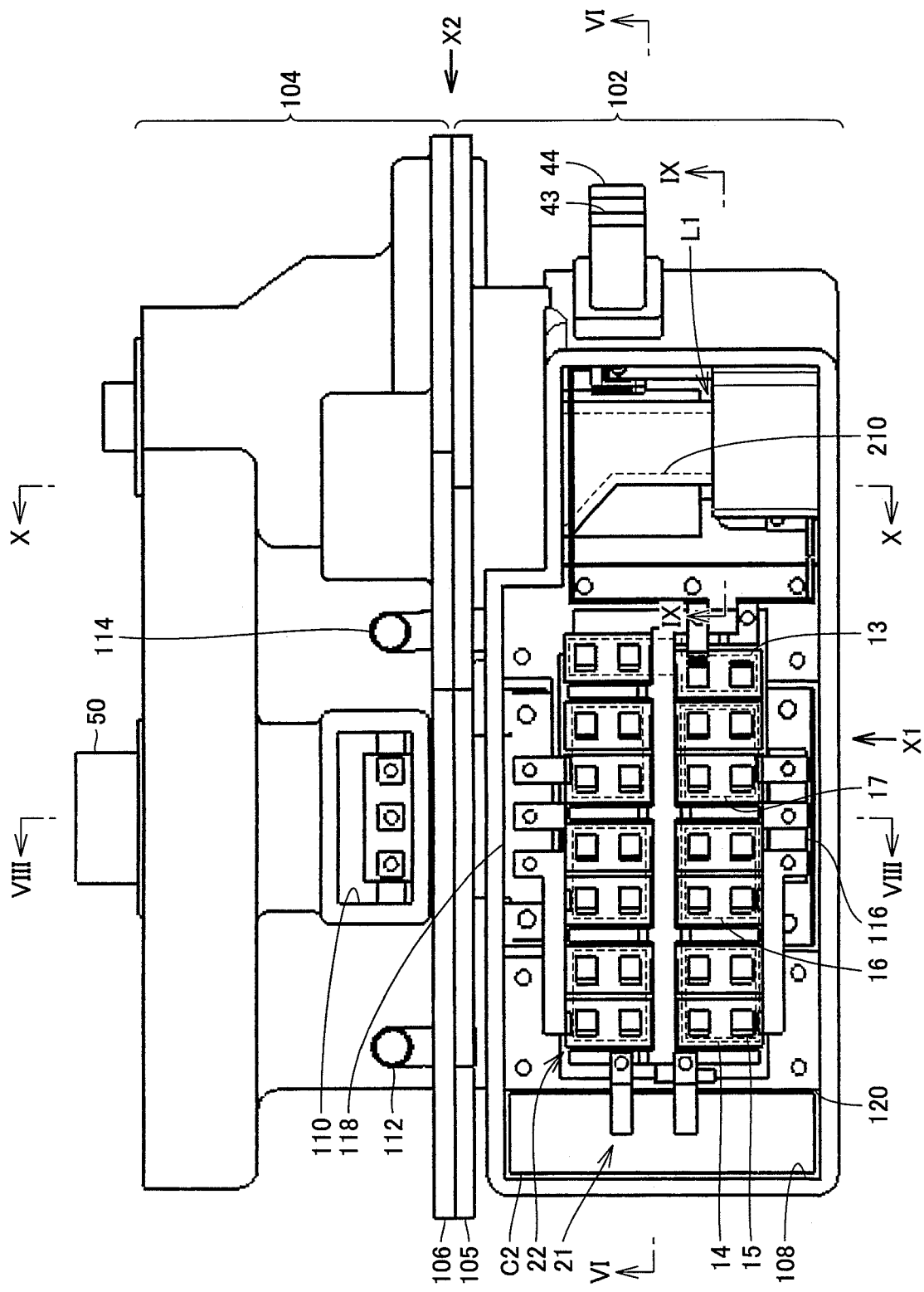
FIG. 4 is a plan view of driving apparatus 20.

FIG. 4 is a plan view of driving apparatus 20.

Referring to FIGS. 3 and 4, the case of driving apparatus 20 is formed dividable into a case 104 and a case 102. Case 104 is mainly for housing motor generator MG1, and case 102 is mainly for housing motor generator MG2 and the power control unit.

A flange 106 is formed on case 104, and a flange 105 is formed on case 102, and flanges 106 and 105 are fixed by means of a bolt or the like, whereby cases 104 and 102 are integrated.

Case 102 is provided with an opening 108 for mounting power control unit 21. On the inner left side (in the direction of vehicle travel) of opening 108, capacitor C2 is housed, and on the right side, reactor L1 is housed. When mounted on the vehicle, opening 108 is closed by a lid. It is noted that arrangement may be reversed such that capacitor C2 is positioned on the right side and reactor L1 is positioned on the left side.

Specifically, reactor L1 is positioned on one side of the rotating shafts of motor generators MG1 and MG2, and capacitor C2 is positioned on the other side. In the area between capacitor C2 and reactor L1, a power element circuit board 120 is arranged. Below power element circuit board 120, motor generator MG2 is arranged.

On power element circuit board 120, inverter 22 controlling motor generator MG1, inverter 14 controlling motor generator MG2, and an arm portion 13 of the boost converter are mounted.

In the area between inverters 14 and 22, power supplying bus bars are arranged overlapped in vertical direction. One bus bar is extended from each of U-phase arm 15, V-phase arm 16 and W-phase arm 17 of inverter 14, to a terminal base 116 connected to the stator coil of motor generator MG2. Similarly, three bus bars are extended from inverter 22 to terminal base 118 connected to the stator coil of motor generator MG1.

Power element circuit board 120 attains to a high temperature and, therefore, a water path is provided below power element circuit board 120 for cooling, and a cooling water inlet 114 and cooling water outlet 112 to/from the water path are provided on case 102. The inlet and outlet may be formed by driving a union nut or the like to case 102, through flanges 106 and 105.

The voltage applied from battery unit 40 of FIG. 1 to terminals 43 and 44 through the power cable is boosted by boost converter 12 including reactor L1 and arm portion 13, and the boosted voltage is smoothed by capacitor C2 and supplied to inverters 14 and 22.

As the battery voltage is used boosted by boost converter 12, it becomes possible to drive the motor generator with a high voltage exceeding 500V, while the battery voltage is reduced to about 200V. Consequently, power loss can be reduced as the power can be supplied with small current, and high output of motor can be realized.

If the inverters 14 and 22, motor generators MG1 and MG2 and, in addition, boost converter 12 are to be integrated as driving apparatus 20, arrangement of reactor L1 and capacitor C2, which are relatively large components, poses a problem.

Referring to FIG. 4, in case 102, an oil passage 210 is further provided to guide cooling lubricant oil to reactor L1. By oil passage 210, the lubricant oil scooped up by a counter-driven gear 132 of FIG. 2 is guided from counter-driven gear 132 to reactor L1.

Figure 5:
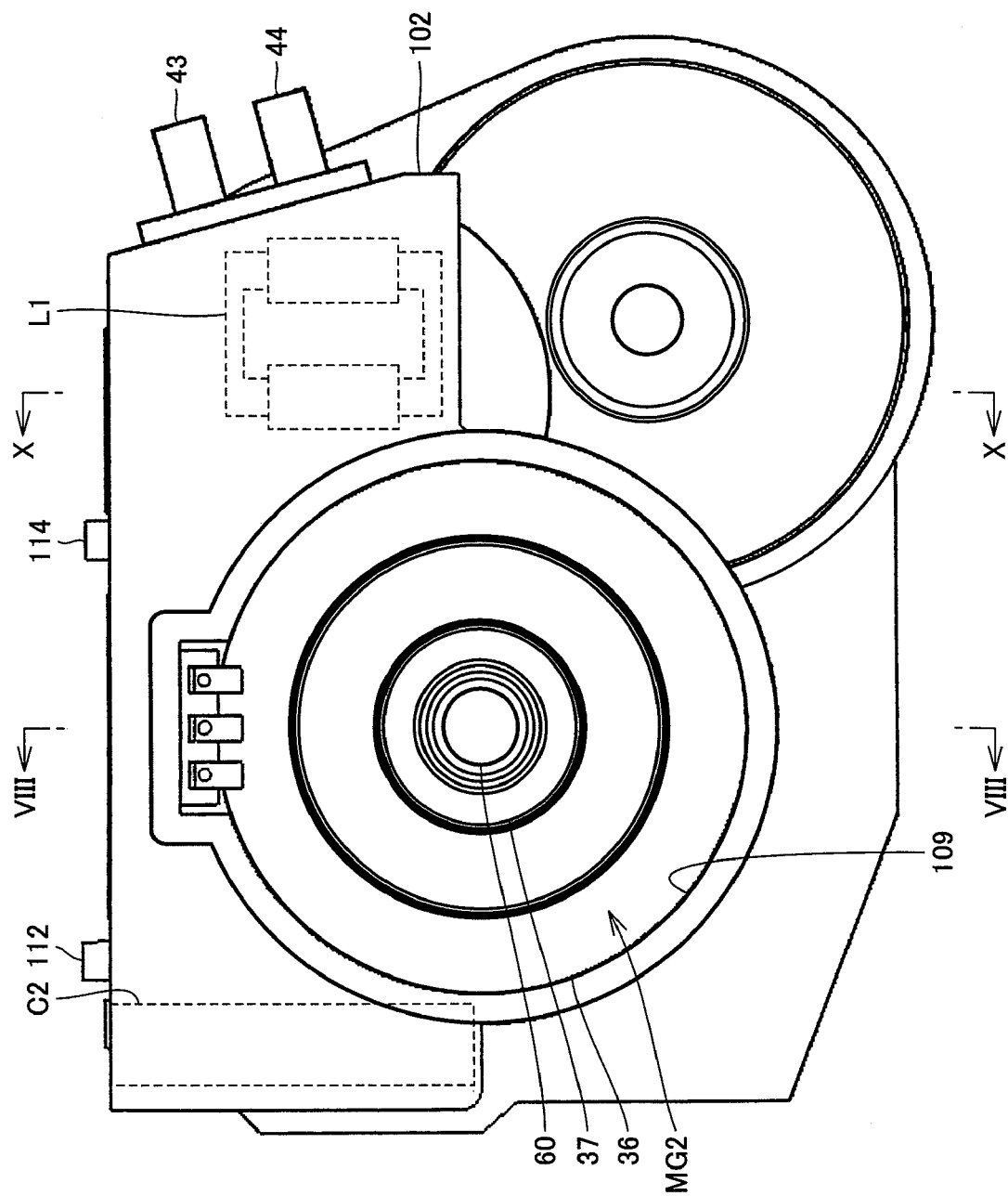
FIG. 5 is a side view of driving apparatus 20 viewed from the direction X1 of FIG. 4.

FIG. 5 is a side view of driving apparatus 20 viewed from the direction X1 of FIG. 4.

Referring to FIG. 5, on case 102, an opening 109 for mounting and maintaining motor generator is provided. When mounted on the vehicle, opening 109 is closed by a lid.

Inside the opening 109, motor generator MG2 is placed. Rotor 37 is arranged in stator 36, to which bus bars of U, V and W phases are connected. At the central portion of rotor 37, a hollow shaft 60 can be seen.

As shown in FIG. 5, stator 36 of motor generator MG2 significantly breaks into the housing chamber of case 102 in which power control unit 21 is housed, and reactor L1 is arranged on one side and capacitor C2 is arrange on the other side of motor generator MG2, whereby large components are packed efficiently. Thus, a compact driving apparatus of a hybrid vehicle is realized.

Figure 6:
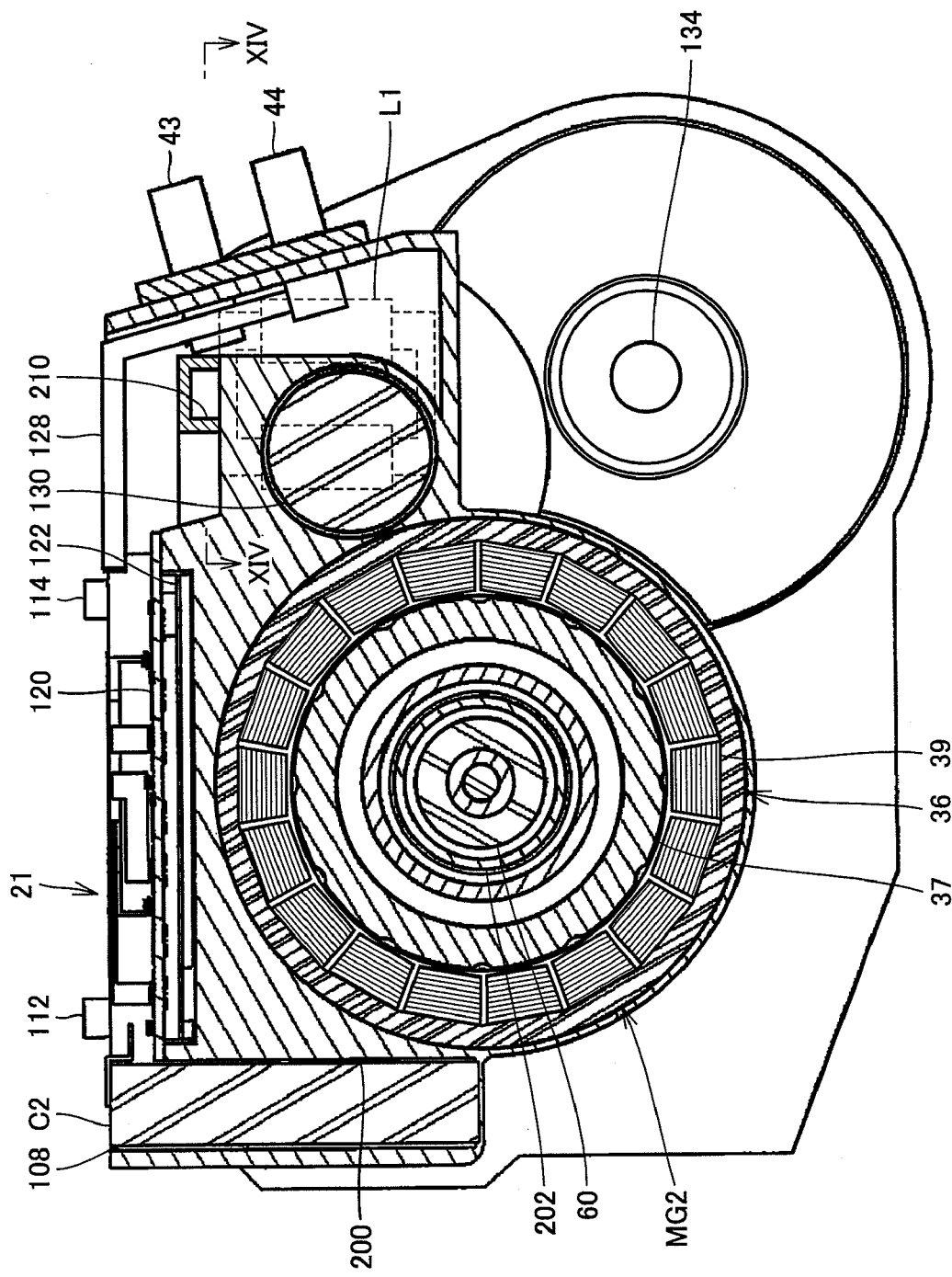
FIG. 6 is a cross-sectional view taken along the line VI-VI of FIG. 4.

FIG. 6 is a cross-sectional view taken along the line VI-VI of FIG. 4.

Referring to FIG. 6, a cross-section of motor generator MG2 and a cross-section of a housing chamber accommodating power control unit 21 are shown.

The driving apparatus for the hybrid vehicle includes: motor generator MG2 and motor generator MG1 arranged on the deeper side of MG2, having central rotation axes of respective rotors arranged coaxially; the power split device arranged coaxially with the central axis of rotation of the crankshaft between motor generators MG1 and MG2; and power control unit 21 controlling motor generators MG1 and MG2. In power control unit 21, reactor L1 and smoothing capacitor C2 are arranged separate from each other, with at least reactor L1 arranged on one side and smoothing capacitor C2 arranged on the other side of the central rotation axis of motor generator MG2. Motor generators MG1 and MG2, the power split device and power control unit 21 are housed in a metal case and integrated.

In order to prevent leakage of lubricant oil of motor generator MG2 to the side of power element circuit board 120, a partition wall 200 separating two spaces is provided in case 102. At an upper surface portion of partition wall 200, a water path 122 is provided for cooling power element circuit board 120, which water path 122 is communicated with cooling water inlet 114 and cooling water outlet 112 described above.

From terminal 44, negative side power supply potential is transmitted to power element circuit board 120 through bus bar 128. From terminal 43, positive side power supply potential is transmitted to reactor L2 through another bus bar, not shown.

A portion supporting rotation axis 130 of reduction gear protrudes to the housing chamber accommodating the power control unit.

Referring to the cross-sectional portion of motor generator MG2, the wound portion of coil 39 of stator 36 can be seen on the inner circumferential side of the stator, and a rotor 37, a partition wall 202 of the case and a hollow shaft 60 of the rotor can be seen on the inner side.

Further, in FIG. 6, a cross-section of oil passage 210 can be seen above rotation shaft 130.

Specifically, the vehicle driving apparatus includes motor generator MG2, power control unit 21 controlling motor generator MG2, and the case housing motor generator MG2 and power control unit 21. Power control unit 21 includes the first inverter driving motor generator MG2 and the voltage converter boosting the power supply voltage and applying the boosted voltage to the first inverter. The voltage converter includes reactor L1. The heat of reactor L1 is dissipated using lubricant oil, which is in contact with reactor L1 and with the case, as a heat transmitting agent. The case has a lubricant circulation path, a part of which is formed by oil passage 21, and reactor L1 is arranged on the circulation path.

Figure 7:
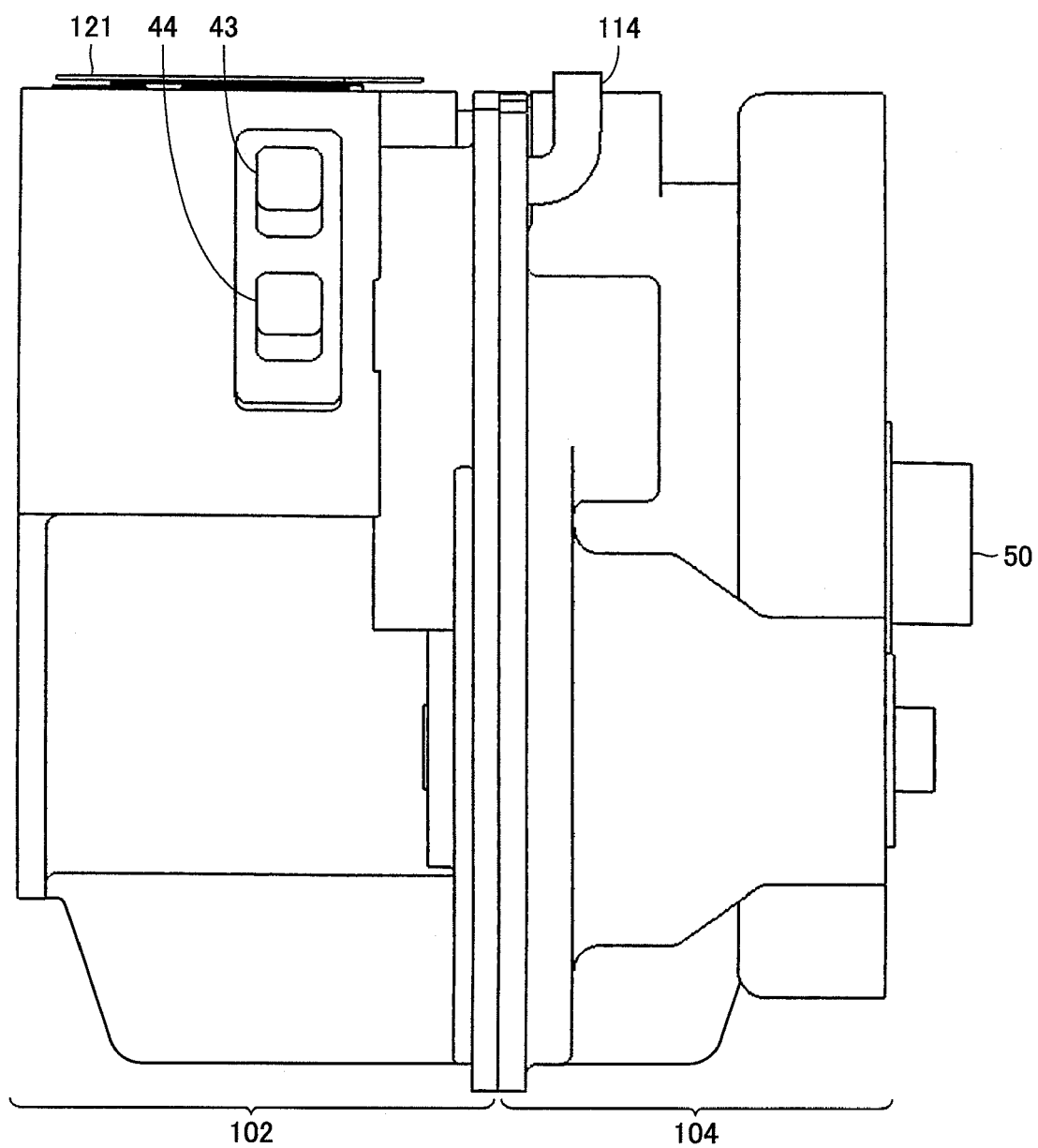
FIG. 7 is a side view of driving apparatus 20 viewed from the direction X2 of FIG. 4.

FIG. 7 is a side view of driving apparatus 20 viewed from the direction X2 of FIG. 4. Referring to FIG. 7, control circuit board 121 for controlling the power element is positioned on the power element circuit board.

Figure 8:
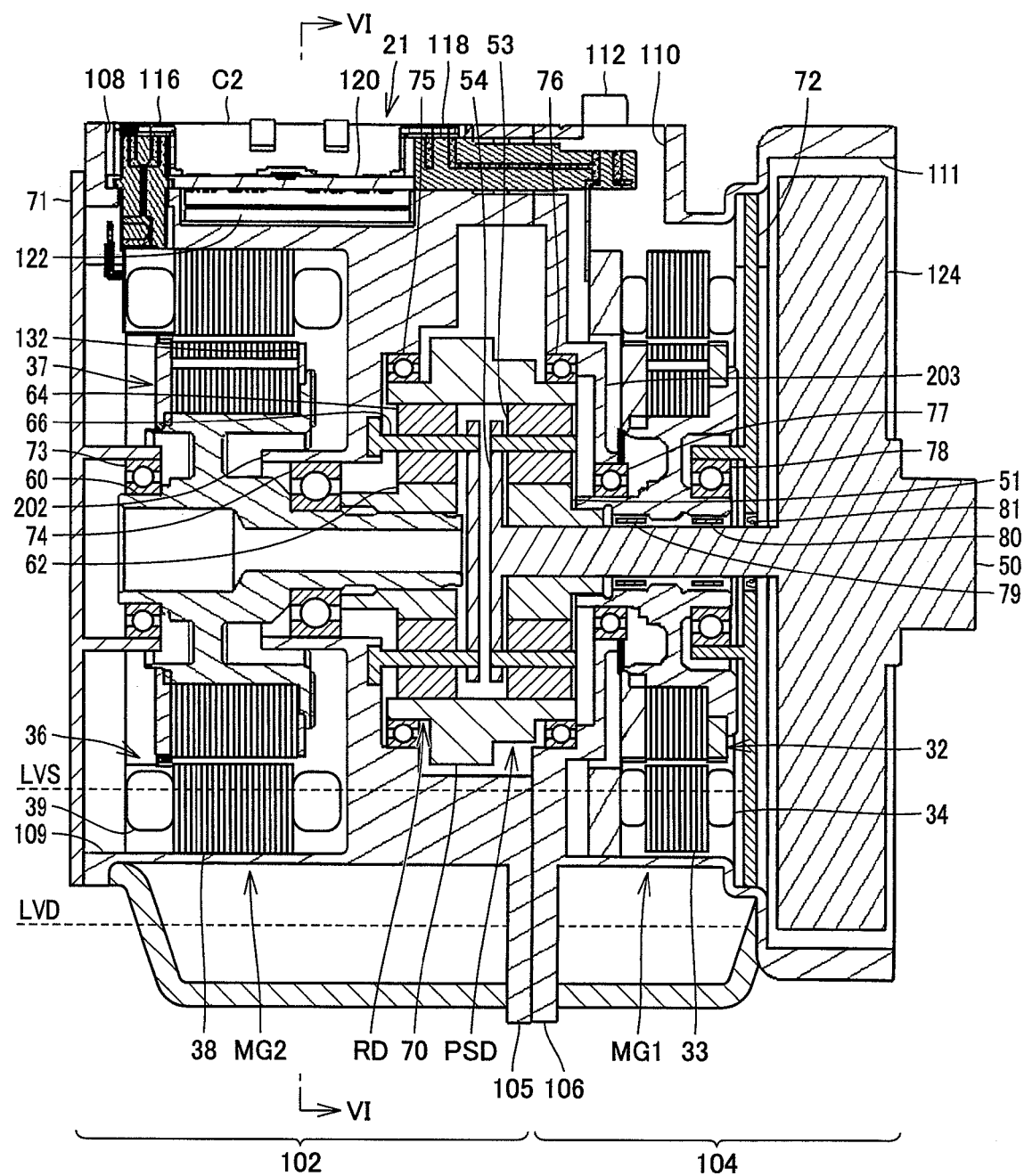
FIG. 8 is a cross-sectional view taken along the line VIII-VIII of FIG. 4.

FIG. 8 is a cross-sectional view taken along the line VIII-VIII of FIG. 4.

Referring to FIGS. 7 and 8, crankshaft 50 of the engine is connected to a dumper 124, and an output shaft of dumper 124 is connected to power split device PSD.

From the side where the engine is positioned, dumper 124, motor generator MG1, power split device PSD, reduction device RD and motor generator MG2 are arranged in this order on one same axis of rotation. The shaft of rotor 32 of motor generator MG1 is hollow, and the output shaft of dumper 124 passes through this hollow portion.

Rotor 32 of motor generator MG1 has its shaft spline-fit with sun gear 51 on the side of power split device PSD. Dumper 124 has its shaft coupled with planetary carrier 54. Planetary carrier 54 rotatably supports the rotation axis of pinion gear 53 about the shaft of dumper 124. Pinion gear 53 meshes with sun gear 51 and ring gear 52 of FIG. 2 formed on the inner circumference of the ring gear case.

Rotor shaft 60 of motor generator MG2 is, on the side of reduction device RD, spline-fit with sun gear 62. Planetary carrier 66 of reduction device RD is fixed on partition wall 202 of case 102. Planetary carrier 66 supports rotation axis of pinion gear 64. Pinion gear 64 meshes with sun gear 62 and ring gear 68 of FIG. 2 formed on the inner circumference of ring gear case.

As can be seen from FIG. 8, motor generator MG1 and dumper 124 can be assembled through an opening 111 on the right of the figure, of case 104, motor generator MG2 can be assembled through an opening 109 on the left of case 102, and reduction device RD and power split device PSD can be assembled from the joining surfaces of flanges 105 and 106.

Opening 109 of case 102 is tightly sealed by a lid 71 and a liquid gasket or the like, to prevent leakage of the lubricant oil. A lid 72 is provided behind the opening 111 of case 104, and the space housing motor generator MG1 is tightly sealed by liquid gasket or oil seal 81 or the like, to prevent leakage of the lubricant oil.

Rotor 32 of motor generator MG1 has its shaft rotatably supported by a ball bearing 78 provided between itself and lid 72 and a ball bearing 77 provided between itself and partition wall 203. The shaft of rotor 32 is hollow, and the shaft of dumper 124 passes therethrough. Between the shaft of rotor 32 and the shaft of dumper 124, needle bearings 79 and 80 are provided.

Rotor 37 of motor generator MG2 has its shaft rotatably supported by a ball bearing 73 provided between itself and lid 71 and a ball bearing 74 provided between itself and partition wall 202.

The ring gear case having the ring gear of reduction device RD and the ring gear of power split device PSD both cut on the inner circumference is rotatably supported by ball bearing 75 provided between itself and partition wall 202 and ball bearing 76 provided between itself and partition wall 203.

Though the housing chamber accommodating power control unit 21 and the housing chamber accommodating motor generator MG2 are separated by partition wall 202 of case 102, the chambers are communicated partially by a through hole through which a terminal base 116 passes. On one side of terminal base 116, the bus bar of stator coil of motor generator MG2 is connected, and on the other side, the bus bar of inverter 14 is connected. In order to enable electrical connection of these bus bars, a conductive member is provided inside terminal base 116. Specifically, terminal base 116 is formed to pass electricity but not to pass the lubricant oil from the side of motor generator MG2.

Similarly, by a terminal base 118, the space accommodating the power control unit and the space accommodating motor generator MG1 are connected in a manner passing electricity but not passing the lubricant oil.

Referring to FIG. 8, an oil pan is provided below motor generators MG1 and MG2. An oil level LVS when the vehicle stops and kept stationary for a while, and an oil level LVD when the vehicle is running and the lubricant oil is circulated for lubrication of various parts are indicated.

Figure 9:
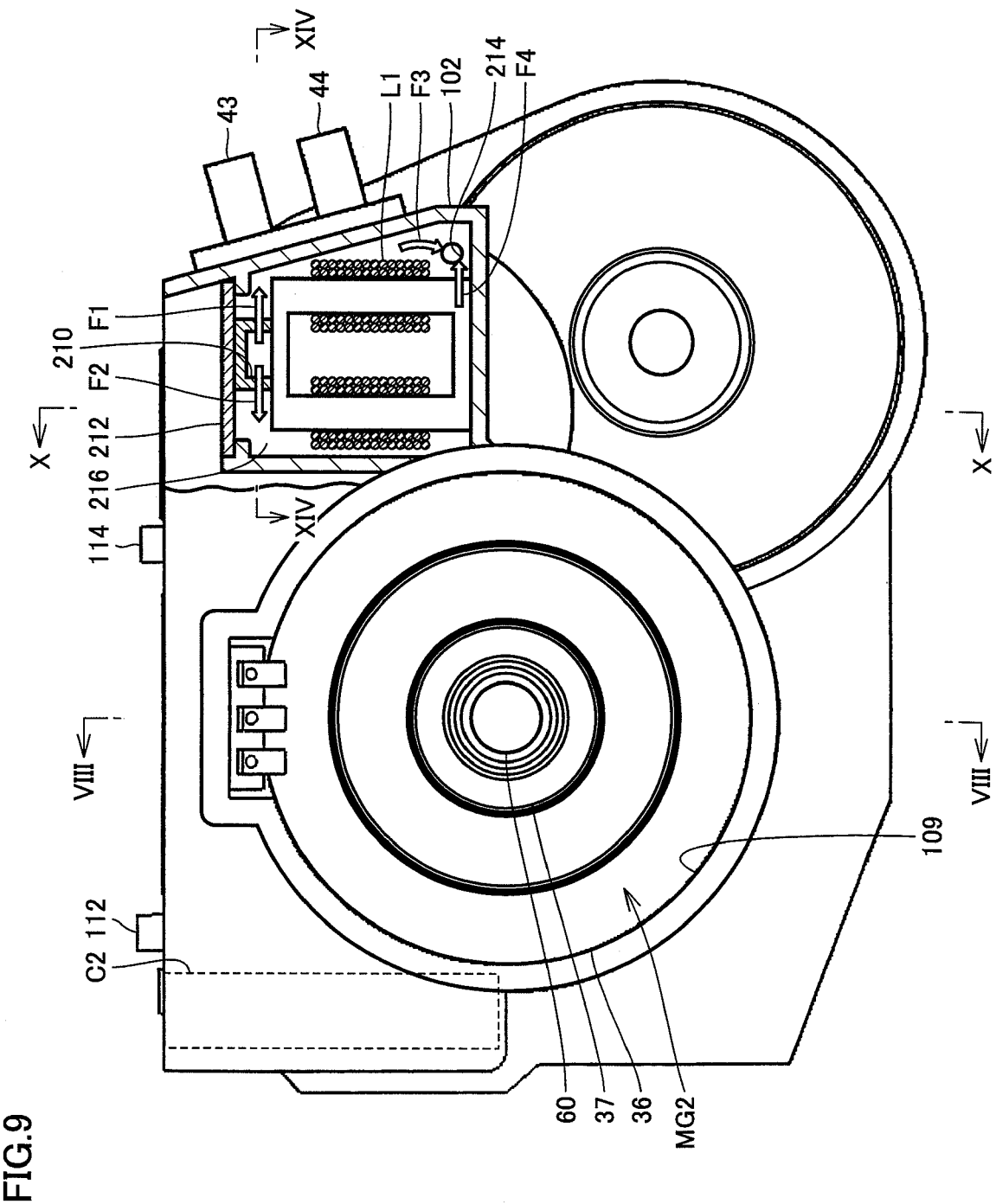
FIG. 9 is a partial cross-sectional view taken along the line IX-IX of FIG. 4.

FIG. 9 is a cross-sectional view showing a partial cross-section taken along the line IX-IX of FIG. 4.

Referring to FIG. 9, an oil chamber 216 as the first chamber housing reactor L1 is separated from the space accommodating other electronic components, by a lid 212. The lubricant oil flowing from oil passage 210 to oil chamber 216 cools reactor L1, flows in the direction of allows F1, F2, F3 and F4 and returns through an oil discharge hole 214 to the side of reduction gear RG.

Figure 10:
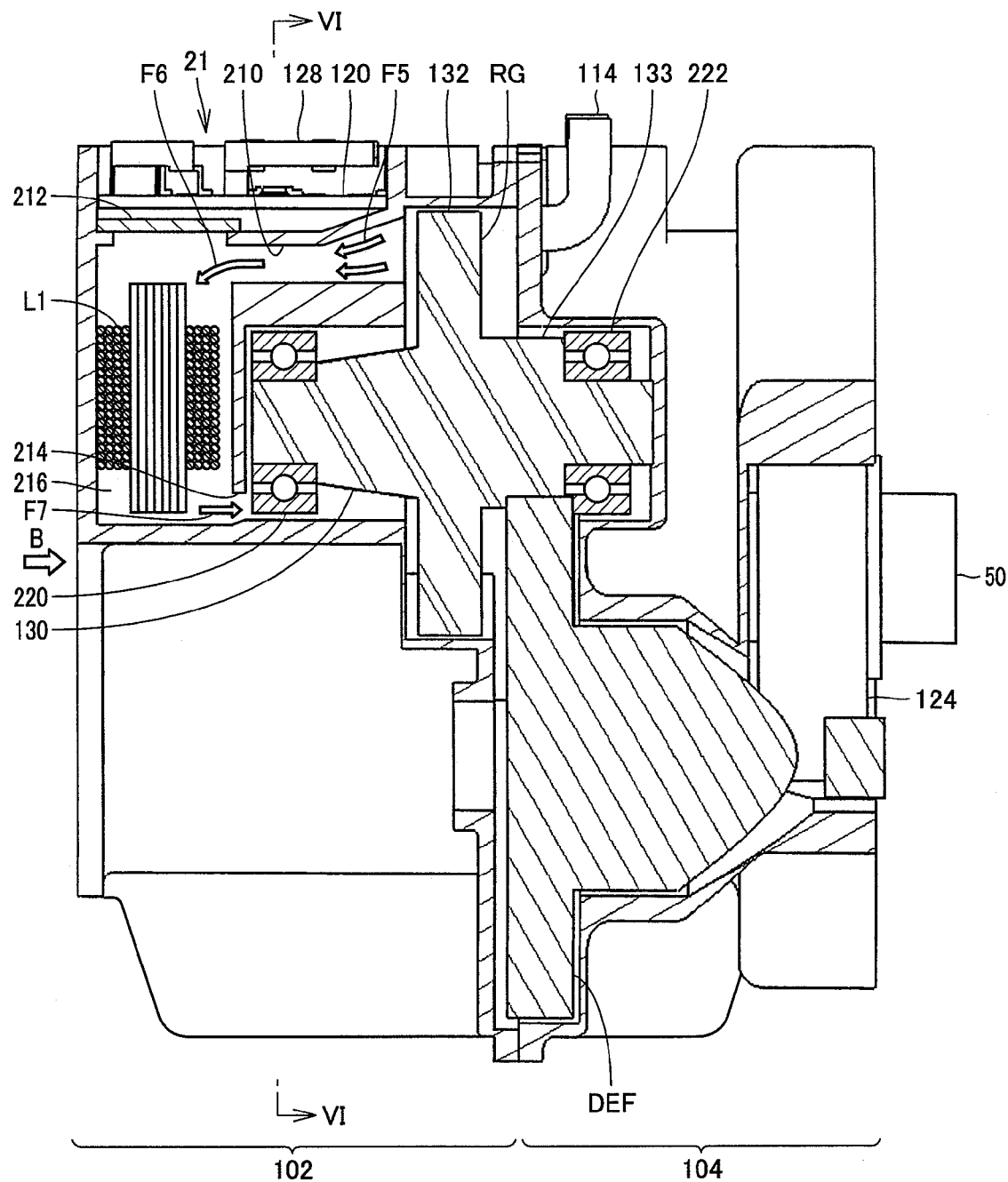
FIG. 10 is a cross-sectional view taken along the line X-X of FIG. 9.

FIG. 10 is a cross-sectional view showing a cross-section taken along the line X-X of FIG. 9.

Referring to FIG. 10, a cross-section of reactor L1 is shown in the housing chamber accommodating power control unit 21. Reactor L1 has, by way of example, a structure having a core provided by stacking electromagnetic plates, on which a coil is wound.

In the vicinity of reactor L1, rotation axis 130 of reduction gear RG shown in FIG. 6 is positioned, and a counter-driven gear 132 of reduction gear RG is shown at the central portion. Rotation axis 130 of reduction gear RG is rotatably supported by ball bearings 220 and 222. Counter-driven gear 132 meshes with a counter-drive gear 70 of FIG. 2. Coaxially with counter-driven gear 132, a final drive gear 133 is provided, and a differential gear DEF as the final driven gear to be meshed therewith is shown therebelow.

Figure 11:
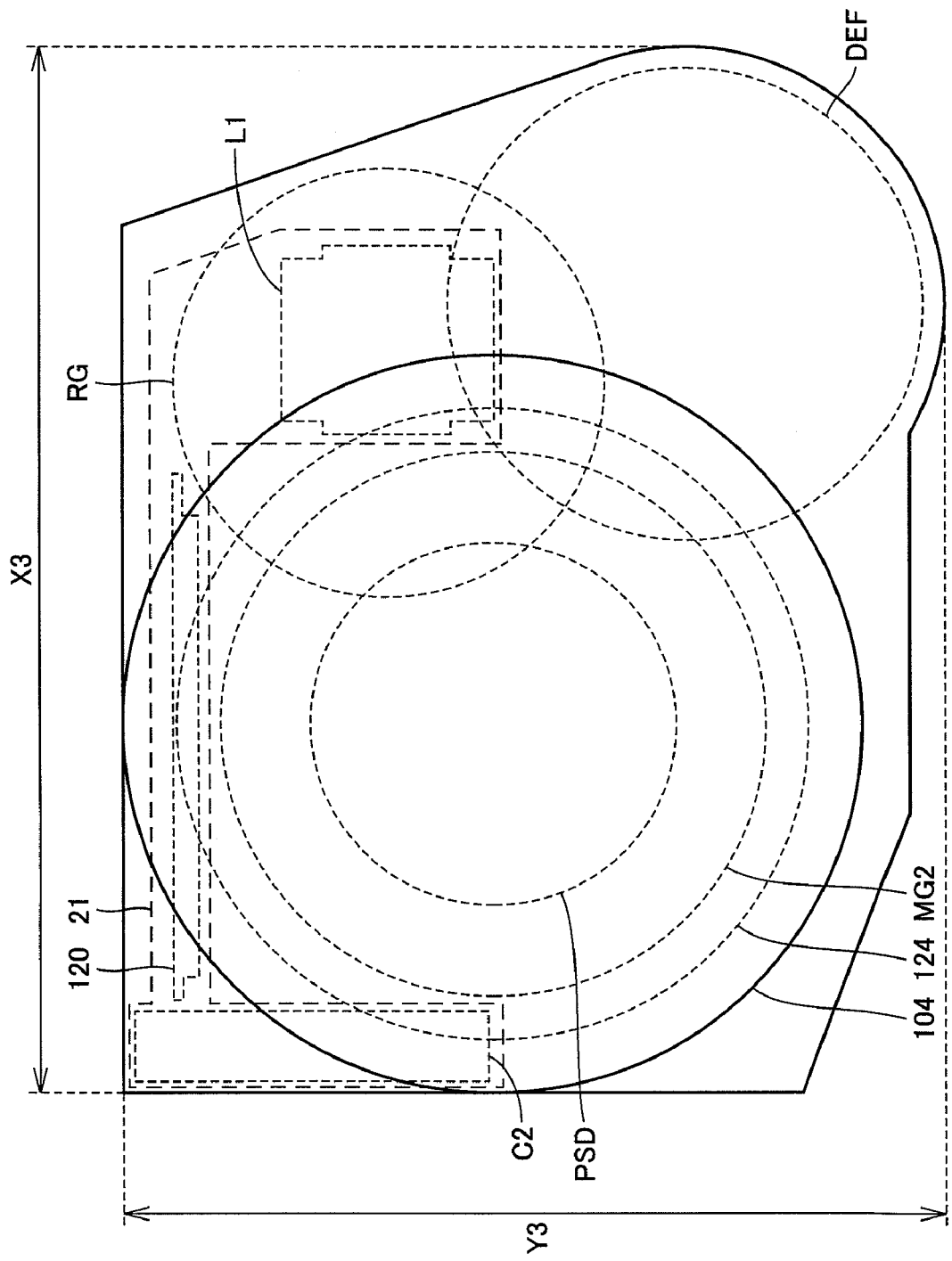
FIG. 11 shows the case contour and components housed in the case, when the case is projected from the direction of rotation axis.

FIG. 11 shows a case contour and components housed therein, with the case projected from the direction of rotation axis.

Referring to FIG. 11, shown in the case of vehicle driving apparatus are: a dumper 124 coupled to the crankshaft of internal combustion engine; motor generator MG2 having a rotor arranged with its rotation axis aligned with the rotation axis of dumper 124 and a stator arranged around the rotor; power split device PSD receiving the torque from dumper 124 and the torque from motor generator MG2; reduction gear RG having a rotation axis shifted approximately parallel to the rotation axis of dumper 124 and receiving torque transmitted from power split device PSD; differential gear DEF having a rotation axis shifted approximately parallel from the rotation axis of dumper 124, meshed with reduction gear RG and transmitting torque to the wheels; and a power control unit 21 including circuit board 120, reactor L1 and capacitor C2 for controlling motor generator MG2. The case houses dumper 124, motor generator MG2, reduction gear RG, differential gear DEF and power control unit 21.

In the projection of the case projected from the direction of rotation axis shown in FIG. 11, the horizontal dimension of the vehicle driving apparatus when it is mounted on the vehicle is represented by X3. The dimension X3 has opposite ends defined by the outer edge of the case portion housing differential gear DEF and the outer edge of case 104 housing dumper 124. Therefore, it can be understood that capacitor C2, circuit board 120 and reactor L1 forming the power control unit are within the dimension X3.

Further, referring to FIG. 11, the vertical dimension (height direction) of the vehicle driving apparatus when it is mounted on the vehicle is represented by Y3. The lower end of dimension Y3 is defined by the outer edge of that portion of the case which houses differential gear DEF. The upper end of dimension Y3 is defined by the outer edge of that portion of the case which houses dumper 124. Therefore, it can be understood that capacitor C2, circuit board 120 and reactor L1 forming the power control unit are arranged within the dimension Y3.

The case is formed and power control unit 21 is arranged such that, when the case is projected in the direction of rotation axis, the projected height of that portion of the case which houses power control unit 21 when mounted on the vehicle is at least the same as or lower than the height of the remaining space of the case, that is, the portion housing dumper 124, motor generator MG2, reduction gear RG and differential gear DEF, when mounted on the vehicle. Thus, the center of gravity of the vehicle can be made low, and running stability can be increased.

Further, the case is formed and power control unit 21 is arranged such that in the horizontal direction when mounted on the vehicle, the position of the projected portion of the case housing power control unit 21 is positioned inside of the projected portion of the remaining space of the case. Thus, the body of vehicle driving apparatus is made small.

Figure 12:
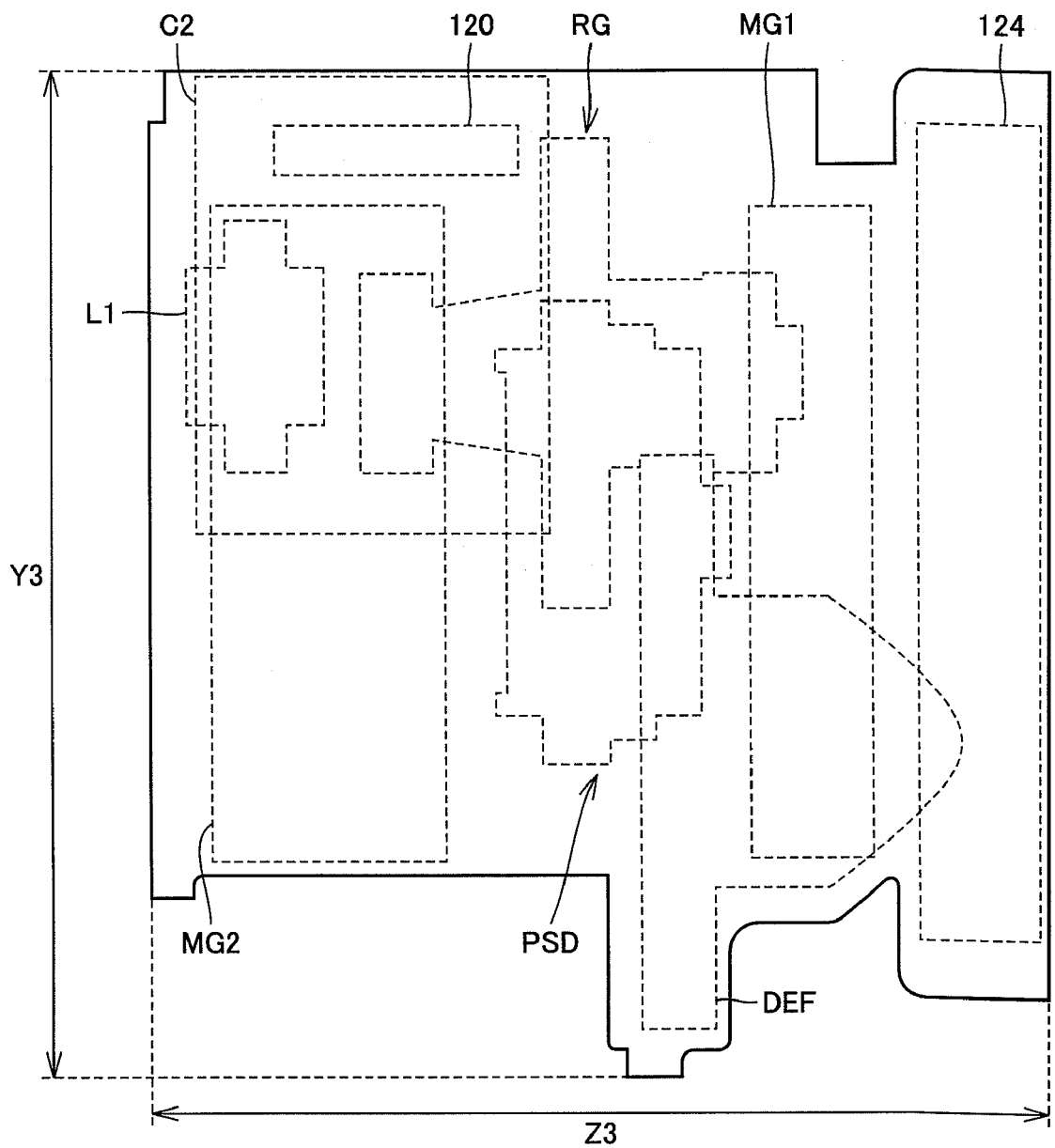
FIG. 12 shows the case contour and components housed in the case, when the case is projected from the direction perpendicular to the rotation axis and perpendicular to the vertical direction.

FIG. 12 shows the case contour and components housed in the case, when the case is projected from the direction perpendicular to the rotation axis and perpendicular to the vertical direction.

Referring to FIG. 12, the dimension Z3 in the direction perpendicular to the vertical direction when mounted on the vehicle also has opposite ends defined by the outer edge of the lid of that portion of the case which houses motor generator MG2 and the outer edge of that portion of the case which houses dumper 124, and it can be seen that capacitor C2, circuit board 120 and reactor L1 forming the power control unit are within the dimension Z3.

Specifically, as described with reference to FIG. 11, the dimension Y3 in the vertical direction (height direction) is determined by the portion housing dumper 124, motor generator MG2, reduction gear RG and differential gear DEF. Further, the portion housing power control unit 21 including circuit board 120, reactor L1 and capacitor C2 is arranged such that, when projected in the direction perpendicular to the direction of rotation axis and perpendicular to the vertical direction when mounted on the vehicle, the projection of that portion is within the remaining space of the case, that is, within the projection of the portion housing dumper 124, motor generator MG2, reduction gear RG and differential gear DEF.

As described above, with motor generators MG1 and MG2, reduction device RD and power split device PSD, as well as reduction gear RG and differential gear DEF arranged in this manner, the power element circuit board 120, reactor L1 and capacitor C2 as components of the power control unit are arranged utilizing the free space in the periphery. Thus, a low and compact driving apparatus for a hybrid vehicle is realized.

As shown in FIG. 11, not only the free space on one side is used for motor generator MG2 but also the free spaces on both sides are used for arranging reactor L1 and capacitor C2. Thus, good weight balance can be attained and the space is saved.

Power split device PSD, reduction gear RG receiving the torque from power split device PSD and differential gear DEF meshed with reduction gear RG and transmitting torque to the wheels correspond, as a whole, to the power transmitting mechanism combining the power generated by the engine with the power generated by motor generators MG1 and MG2, and transmitting the resulting power to the driving shaft.

Further, reduction gear RG and differential gear DEF both correspond to the power transmission gears to which the torque from power split device PSD is transmitted. The reduction gear RG and the differential gear DEF are not always necessary, and the present invention is applicable to a vehicle having a structure without reduction gear RG or a rear-wheel drive structure in which the differential gear DEF is not integrated with the driving mechanism.

Further, the present invention is applicable to a parallel hybrid in which the motor assists driving when the engine is accelerated, and it is also applicable to a structure in which only one motor is integrated with the driving apparatus.

Figure 13:
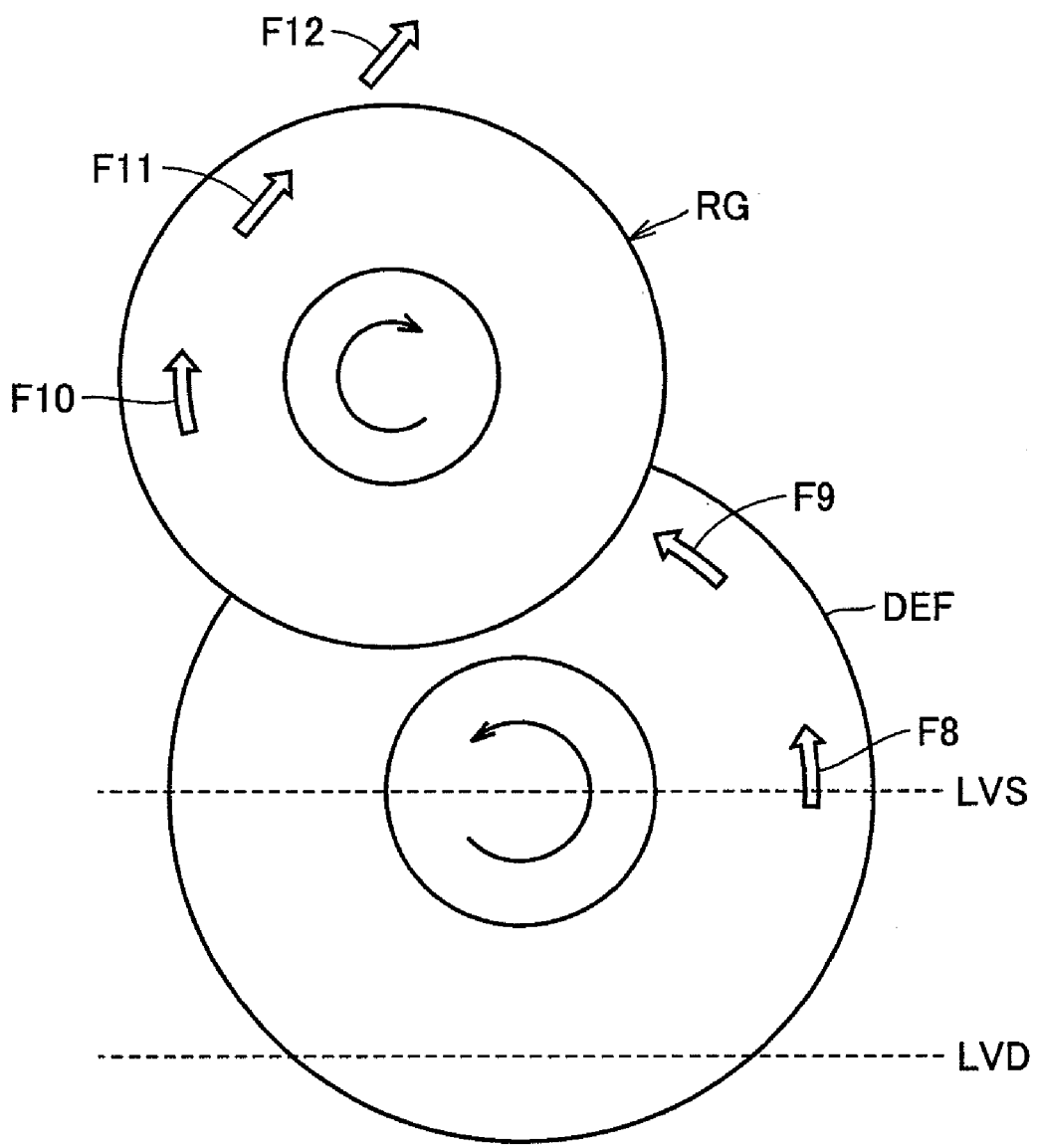
FIG. 13 shows the direction of the lubricant oil scooped up by a differential gear DEF and a reduction gear RG.

FIG. 13 shows the direction of the lubricant oil scooped up by differential gear DEF and reduction gear RG.

Referring to FIGS. 10 and 13, the lubricant oil reserved in the oil pan is lifted up by the rotation of differential gear DEF toward reduction gear RG, as represented by arrows F8 and F9. Then, as the reduction gear RG rotates, the lubricant oil is further lifted up as represented by arrows F10 to F12.

Then, the lubricant oil flows through oil passage 210, enters oil chamber 216 and cools reactor L1, as represented by arrows F5 and F6. Then, the lubricant oil flows out through oil discharge hole 214 to the space housing reduction gear RG, as represented by arrow F7.

By making the diameter of oil discharge hole 214 small enough to serve as an orifice limiting the flow rate, it is possible to keep reactor L1 immersed in the lubricant oil, when the lubricant oil flows into oil chamber 216.

In the present embodiment, fluid lubricant oil is used to dissipate heat of the reactor, while it is possible to transmit the heat of reactor to the case by not opening the oil discharge hole and immersing the reactor in the lubricant oil. As another example, grease or the like of low fluidity may be used to fill the space between the case and the reactor in the case, so that the heat of reactor is transmitted to the case and radiated therefrom. In these examples, the lubricant oil and the grease serve as heat transmitting agent that transmits heat from the reactor to the case.

Figure 14:
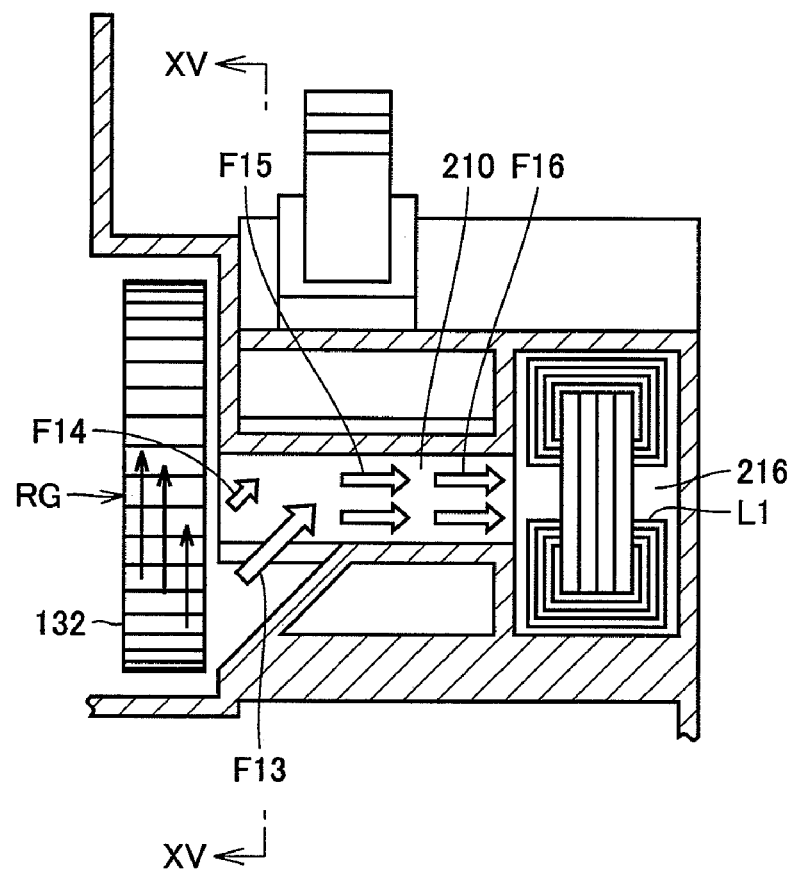
FIG. 14 is a partial cross-sectional view taken along the line XIV-XIV of FIG. 9.

FIG. 14 is a partial cross-sectional view taken along the line XIV-XIV of FIG. 9.

Figure 15:
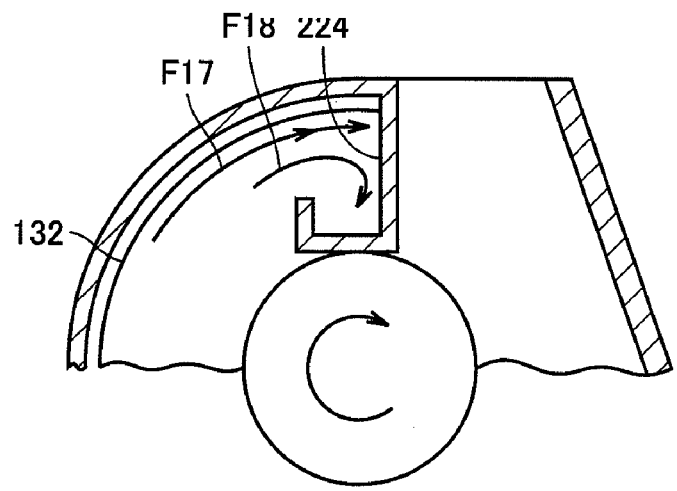
FIG. 15 is a partial cross-sectional view taken along the line XV-XV of FIG. 14.

FIG. 15 is a partial cross-sectional view taken along the line XV-XV of FIG. 14.

Referring to FIGS. 14 and 15, the lubricant oil scooped up by counter-driven gear 132 of reduction gear RG is moved upward as represented by arrows F17, F18 and F14 and F13. If an oil catch plate 224 is arranged to receive the thus lifted lubricant oil, part of the scooped oil can effectively be guided to oil chamber 216 containing reactor L1, as represented by arrows F15 and F16.

Figure 16:
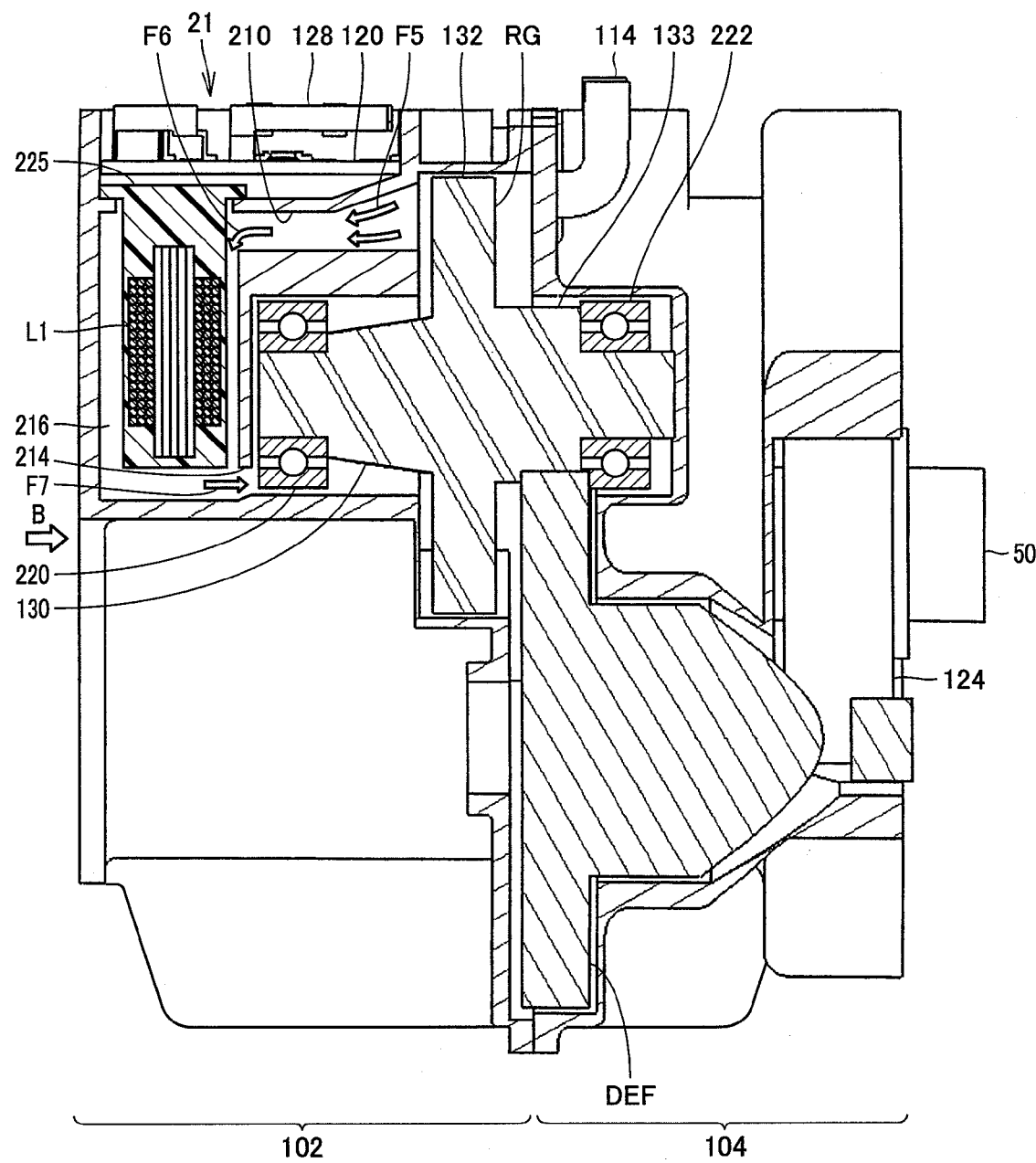
FIG. 16 shows a modification of a reactor portion L1.

FIG. 16 shows a modification of a reactor portion L1.

The modification shown in FIG. 16 differs from the structure shown in FIG. 10 in that reactor L1 is molded by an insulating resin and the upper end of the molded portion is processed to have a flange shape, so that it also serves as a lid of oil chamber 216. On the flange-shaped lid of insulating resin, a terminal for connecting the reactor to the bus bar is provided, though not shown. Other portions are the same as those shown in FIG. 10 and, therefore, description will not be repeated. This facilitates assembly of reactor L1, and the number of components can be reduced.

As described above, Embodiment 1 realizes the driving apparatus integrated with the boost converter and the inverter. Even when integrated, heat of the reactor of the boost converter can satisfactorily be dissipated, and the efficiency of the boost converter is not lowered.

EMBODIMENT 2

Figure 17:
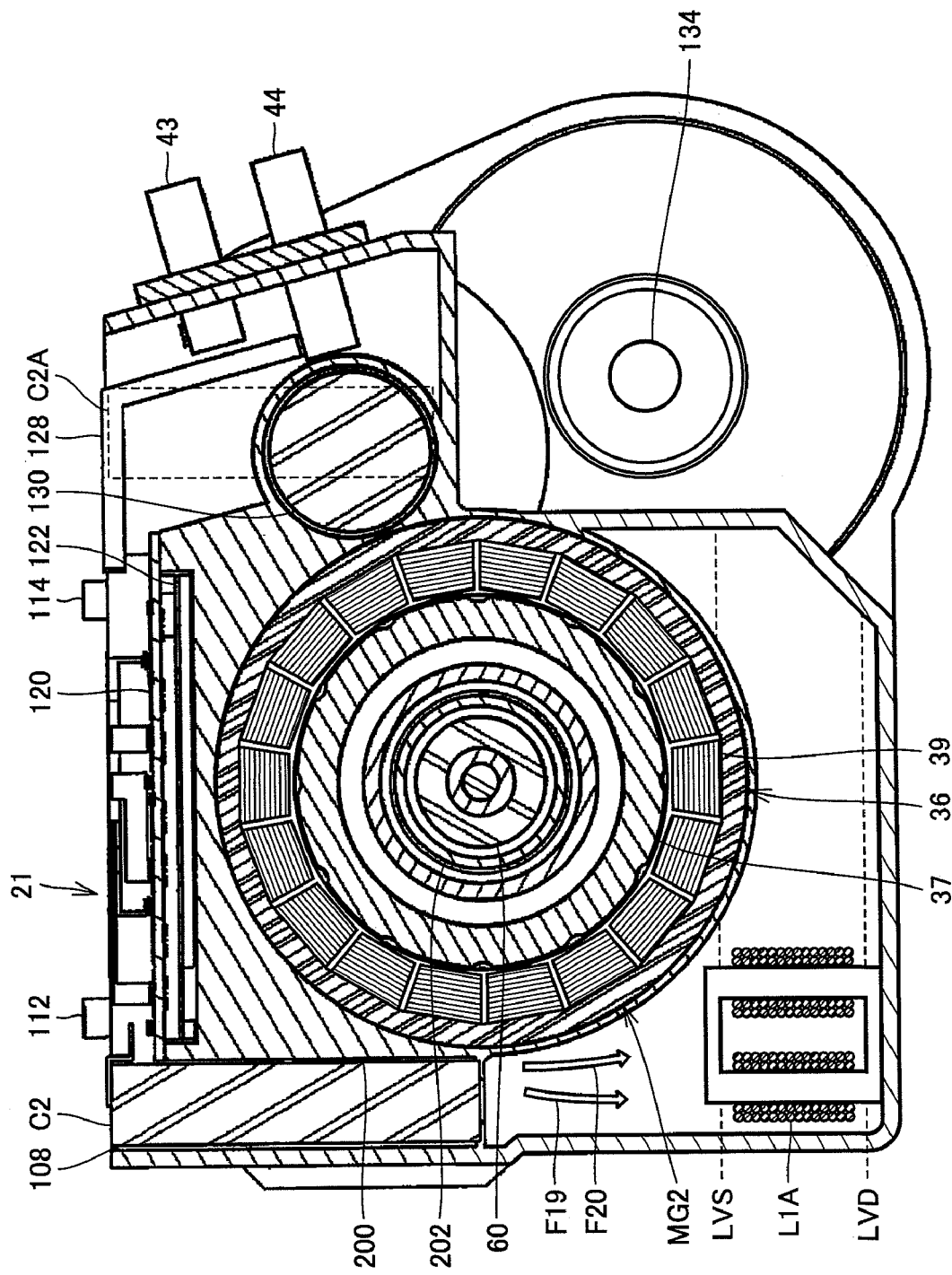
FIG. 17 is a cross-section of the vehicle driving apparatus in accordance with a second embodiment.

FIG. 17 is a cross-section of the vehicle driving apparatus in accordance with Embodiment 2.

Referring to FIG. 17, in Embodiment 2, reactor L1A is arranged in an oil pan below motor generator MG2. An oil passage is provided in partition wall 200 such that the lubricant oil scooped up by differential gear DEF and reduction gear RG in Embodiment 1 drops down as represented by arrows F19 and F20. Thus, heat generated in reactor L1A is dissipated through the lubricant oil.

If capacitor C2 interferes with reactor L1A or hinders provision of oil passage in partition wall 200, the capacitor may be moved to the portion where reactor is positioned in Embodiment 1. By way of example, capacitor C2A may be arranged, in place of capacitor C2.

Embodiment 2 also realizes the driving apparatus integrated with the boost converter and the inverter. Even when integrated, heat of the reactor of the boost converter can satisfactorily be dissipated, and the efficiency of the boost converter is not lowered.

OTHER EMBODIMENT

Figure 18:
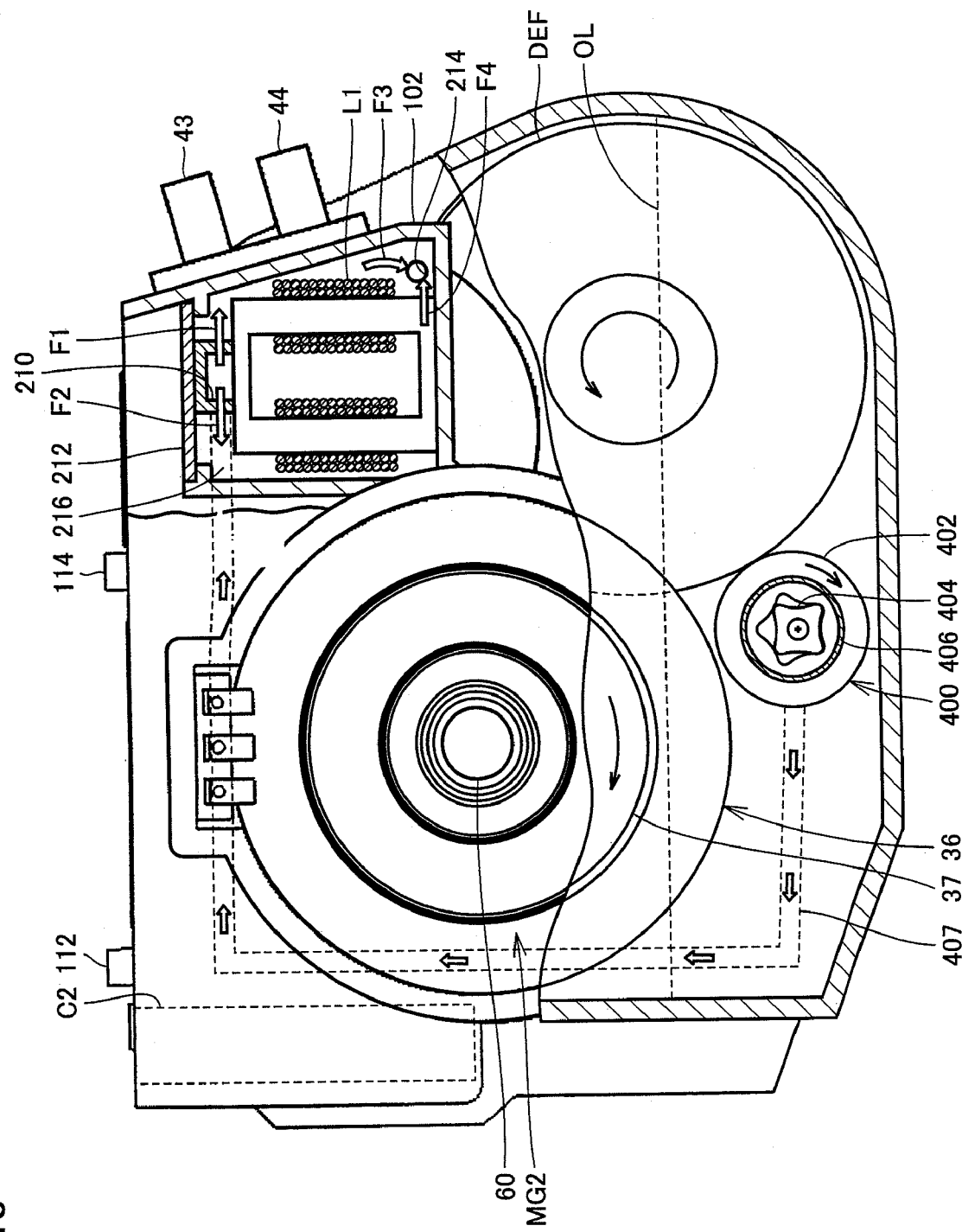
FIG. 18 is an illustration showing a modification of the portion for circulating the lubricant oil.

FIG. 18 is an illustration showing a modification of the portion for circulating the lubricant oil.

The structure shown in FIG. 18 corresponds to the structure of Embodiment 1 and, different from the arrangement of scooping up the oil, it includes an oil pump for pumping up the lubricant oil from an oil pool and supplies the oil for cooling reactor L1.

Referring to FIG. 18, in this exemplary oil circulation path, a trochoidal oil pump 400 is provide to pump up the lubricant oil from the oil pool at the bottom of the case and to transmit the lubricant oil to oil passage 407. The outlet of oil passage 407 is positioned upstream than the power control unit including circuit board 120, in the lubricant path.

Oil pump 400 includes a driving gear 402 that meshes with differential gear DEF, an inner rotor 404 having its shaft coupled to driving gear 402 and rotates together, and an outer rotor 406 having inner teeth meshed with inner rotor 404.

The outlet of oil passage 407 is communicated with oil passage 210 for guiding the cooling lubricant oil to reactor L1 and to oil chamber 216. The lubricant oil flowing from oil passage 210 to oil chamber 216 cools reactor L1, flows as represented by arrows F1, F2, F3 and F4, and returns to the side of reduction gear RG.

The modification shown in FIG. 18 also attains similar effects as attained by the example of Embodiment 1.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A vehicle driving apparatus, comprising:
   a first rotating electrical machine;
   a power control unit controlling said first rotating electrical machine; and
   a case, having a lubricant circulation path for lubricant oil lubricating said first rotating electrical machine and housing said first rotating electrical machine and said power control unit; wherein
   said power control unit includes
   a first inverter driving said first rotating electrical machine, and
   a voltage converter boosting a power supply voltage and applying the boosted voltage to said first inverter; and
   said voltage converter includes
   a reactor arranged on said circulation path to be in contact with said circulating lubricant oil;
   said vehicle driving apparatus further comprising
   a circulating portion for circulating said lubricant oil in said circulation path; wherein said circulating portion includes
   a gear that is immersed in said lubricant oil, rotates as said first rotating electrical machine rotates, and scoops up and circulates said lubricant oil.

2. The vehicle driving apparatus according to claim 1, wherein
   said case includes
   an oil pan arranged at the bottom of said case and reserving said lubricant oil, and
   a reactor housing chamber for accommodating said reactor, having, at an upper portion, an opening of an oil passage for guiding the lubricant oil for cooling, scooped up from said oil pan by said gear, and having, at a lower portion, an oil discharge hole.

3. The vehicle driving apparatus according to claim 2, wherein
   diameter of said oil discharge hole is smaller than opening of said oil passage, and
   said oil discharge hole is provided at a portion higher than lubricant oil level of said oil pan.

4. The vehicle driving apparatus according to claim 1, wherein
   said power control unit further includes
   a circuit board on which said first inverter and a power element of said voltage converter are mounted;
   said circuit board is cooled by cooling water; and
   said reactor is cooled by said lubricant oil.

5. The vehicle driving apparatus according to claim 1, wherein
   said case includes
   a first housing chamber accommodating said reactor; and
   said reactor is immersed in said lubricant oil in said first housing chamber.

6. The vehicle driving apparatus according to claim 5, wherein
said case further includes
a second housing chamber accommodating said first rotating electrical machine, and
a partition wall separating said first and second housing chambers; and
a hole forming a part of said circulation path is formed in said partition wall.

7. The vehicle driving apparatus according to claim 5, wherein
said reactor includes
a coil,
an iron core, and
an insulator molding said coil and said iron core; and
said insulator is formed to have a flange shape to serve as a lid of said first housing chamber.

8. The vehicle driving apparatus according to claim 5, wherein
said first housing chamber is an oil pan reserving said lubricant oil.

9. The vehicle driving apparatus according to claim 1, wherein
said vehicle includes an internal combustion engine; and
said vehicle driving apparatus further comprising:
a second rotating electrical machine, and
a power split device having a first shaft receiving rotation of a rotor of said first rotating electrical machine, a second shaft receiving rotation of rotor of said second rotating electrical machine and a third shaft receiving rotation of a crank shaft; wherein
said case further houses said second rotating electrical machine and said power split device.

10. The vehicle driving apparatus according to claim 9, wherein
said power control unit further includes a second inverter provided corresponding to said second rotating electrical machine; and
said voltage converter is provided commonly to said first and second inverters.

* * * * *